United States Patent [19]

Heifetz

[11] Patent Number: 4,606,522
[45] Date of Patent: Aug. 19, 1986

[54] POSITION ADJUSTABLE INSTRUMENT HOLDER

[76] Inventor: Milton D. Heifetz, 704 N. Bedford Dr., Beverly Hills, Calif. 90210

[21] Appl. No.: 644,170

[22] Filed: Aug. 23, 1984

[51] Int. Cl.³ .......................... E04G 3/00; F16C 11/06
[52] U.S. Cl. ..................................... 248/276; 403/55; 248/288.5
[58] Field of Search ............... 248/276, 288.3, 288.9, 248/278, 123.1, 160, DIG. 4; 403/55, 56, 90

[56] References Cited

U.S. PATENT DOCUMENTS

| | | | |
|---|---|---|---|
| 1,382,783 | 6/1921 | Howard | 248/276 |
| 2,304,460 | 12/1942 | Kelleher | 248/DIG. 4 |
| 3,240,516 | 3/1966 | Barish | 403/55 |
| 3,910,538 | 10/1975 | Baitella | 248/276 |
| 4,143,652 | 9/1983 | Meier | 128/20 |
| 4,402,481 | 9/1983 | Sasaki | 248/276 |
| 4,431,329 | 2/1984 | Baitella | 248/276 |
| 4,491,435 | 1/1985 | Meier | 248/276 |

Primary Examiner—Reinaldo P. Machado
Assistant Examiner—Alvin Chin-Shue
Attorney, Agent, or Firm—Donald D. Mon

[57] ABSTRACT

A jointed holder for holding articles, for example surgical retractors. The holder has a succession of rigid link shafts and a link joint and a terminal joint with drive pins in the link shafts and force transmission means in the link joints whereby tightening of a drive means will rigidify the holder in an adjusted position.

14 Claims, 5 Drawing Figures

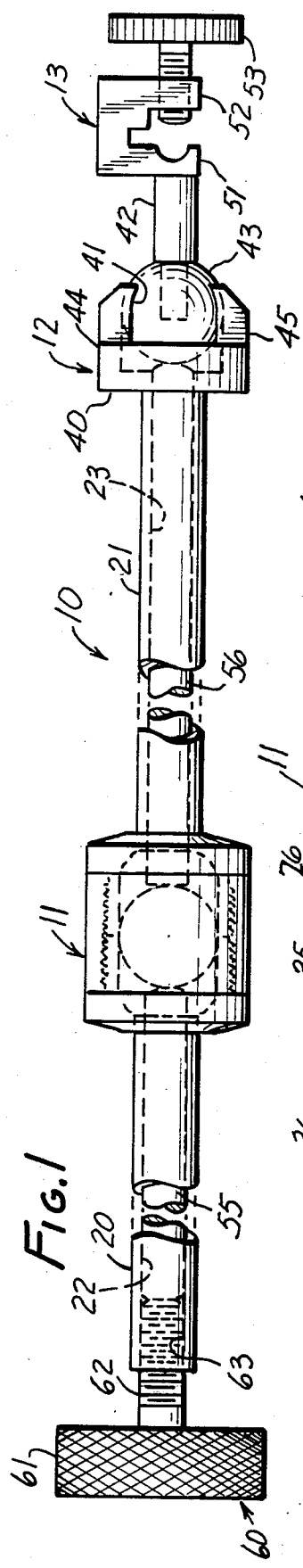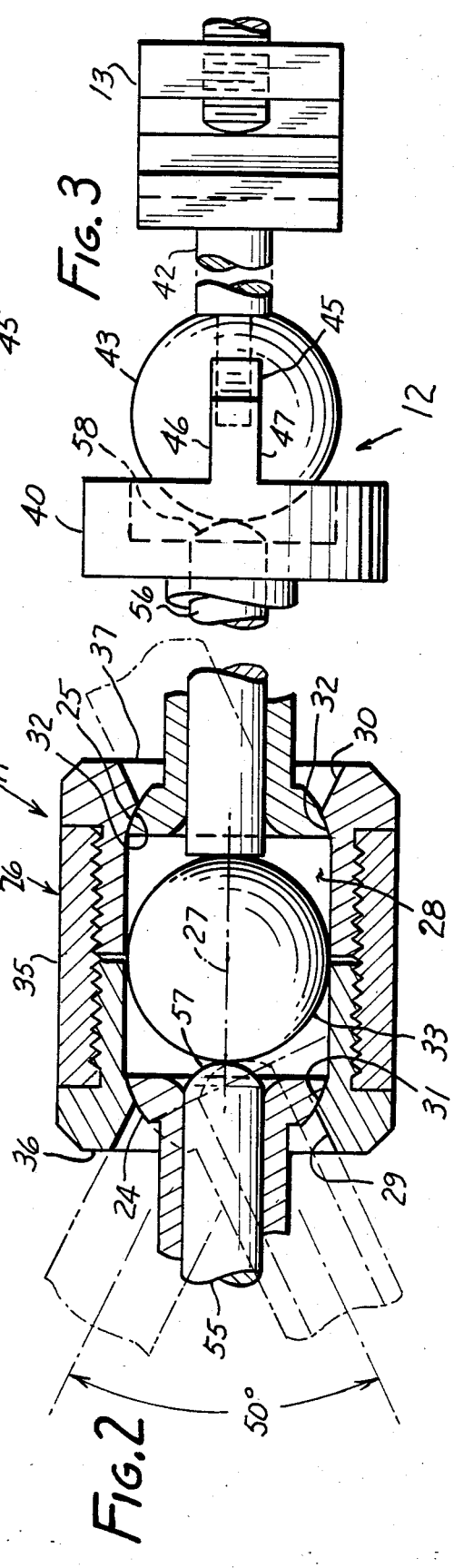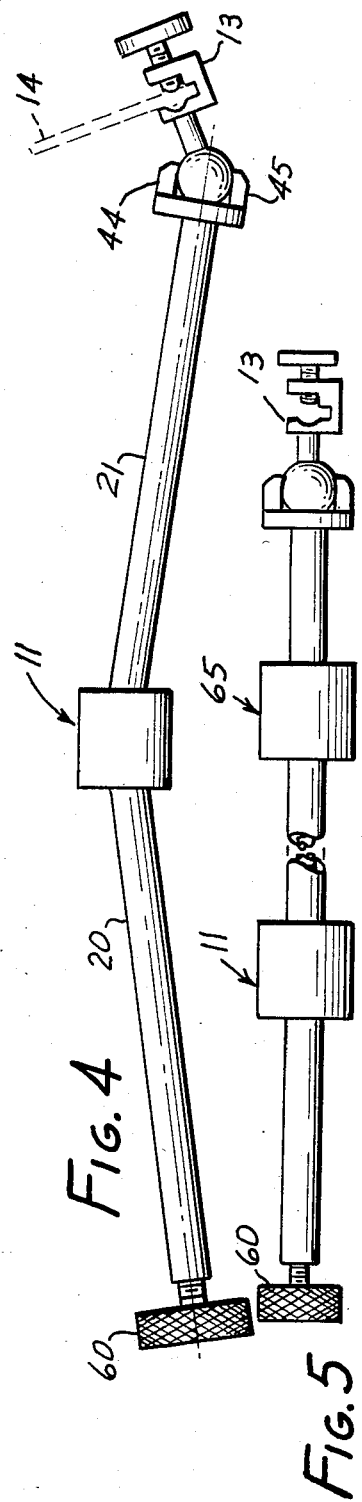

POSITION ADJUSTABLE INSTRUMENT HOLDER

FIELD OF THE INVENTION

This invention relates to holders to position instruments and tools in an adjusted position.

BACKGROUND OF THE INVENTION

Especially in the field of surgery, but not exclusively in this field, there is a pervasive need for a holder that can grasp an instrument or a tool, and can hold it in an adjusted position. An example is a brain retractor. In the use of the brain retractor, the patient is suitably located and fixed. Then an incision and an opening are made. Thereafter a retractor is inserted into the brain and is pulled on to draw a portion of the brain aside so the surgeon can have access to some deeper region.

It is, of course, a potential solution to have a nurse or another surgeon hold the retractor, but this crowds the area, and is tiring and wasteful. Accordingly, holders for retractors have been devised which can be mounted to something and then bent to a desired configuration where they will hold the brain, and hopefully they will do the job. The problem with such devices is that they are difficult to adjust precisely, and after they are adjusted they tend to creep. Therefore the surgeon must sometimes bother with them just when all of his attention should be directed to his primary objective.

It is an object of this invention to provide a holder which can readily be set to an adjusted position, and will stay there, without requiring bending or other distortive manipulations. Its adjusted position is retained by the mere tightening of a screw or thumb wheel.

BRIEF DESCRIPTION OF THE INVENTION

A holder according to this invention includes a link joint and a terminal joint. The link joint includes a pair of rigid link shafts, a force transmission means, and a pair of swivel seat/swivel head assemblies. The terminal joint includes a clamp and a swivel seat/swivel head assembly. A series of rigid drive rods pass through the link shafts. Drive means interlinks one of the drive rods with a link shaft through which it passes. the effect of driving the drive rod is to "stretch out" the assembly, along the angulated path defined by the adjusted parts. This results in rigidifying the link joint (or joints) and the terminal joint by immobilizing the swivel head/swivel seat assemblies. The force transmission means enables the drive movement to be exerted along an angulated path instead of merely along a straight path, so that fixing the adjustment of the holder requires no more than the tightening of a screw to hold the device in an adjusted position from which it will not creep.

The above and other features of this invention will be fully understood from the following detailed description and the accompanying drawings in which:

BRIEF DESCRIPTION OF THE DRAWINGS

FIG. 1 is a side elevation partly in cut-away cross-section showing the presently preferred embodiment of the invention;

FIG. 2 is an axial cross-section, partly in schematic notation, showing a link joint according to the invention;

FIG. 3 is a bottom view of the terminal joint portion of FIG. 1;

FIG. 4 shows the device of FIG. 1 in an adjusted position; and

FIG. 5 shows the device of FIG. 1 with an additional link joint.

DETAILED DESCRIPTION OF THE INVENTION

In FIG. 1 there is shown a jointed holder 10 according to the invention. Its objective is to be adjustable and to be rigidified in any adjusted position within its range of adjustment. An example of such an adjustment is shown in FIG. 4.

The holder includes one or more link joints 11 and a terminal joint 12. The terminal joint supports a clamp 13 for the purpose of holding an object 14 such as a retractor (See FIG. 4).

The construction begins with a link joint. All of the link joints are identical so that only link joint 11 will be described in detail. It comprises a first link shaft 20 and a second link shaft 21. Each link shaft has a respective axial passage 22, 23 therethrough. The link shafts are rigid and tubular. Each link shaft has a respective swivel head 24, 25 adjacent to an end thereof, the head extending around and projecting beyond the outer wall of its respective shaft.

The link joint further includes a link housing 26 having an axis 27, an internal axial chamber 28 and a first port 29 and a second port 30 entering the chamber coaxially on its axis. A first swivel seat 31 and a second swivel seat 32 face into the chamber coaxial with the ports and with the axis, and face toward each other. Each of the swivel shafts passes through a respective port with its swivel head in contact with the respective swivel seat. Each swivel shaft has an outer diameter smaller than the least transverse dimension of this respective port to enable the link shaft to be moved angularly relative to the swivel seat in all lateral directions relative to the axis. A force transmission member 33 is axially movably disposed inside the chamber. In the preferred embodiment this member is a ball. The ball has a diameter slightly smaller than the diameter of the chamber and smaller than the axial length of the chamber for a reason which will become evident.

As best shown in FIG. 2, the link housing may conveniently be formed with a tubular sleeve 35 which is internally threaded and a pair of end caps 36, 37 which are threaded into the sleeve and which bear the swivel seats. As can best be seen in FIG. 2, the rigid link shafts can be swiveled by movement between the swivel heads and the swivel seats within the limits of the construction.

Terminal joint 12 comprises a terminal joint base 40 which is fixed to one of the link shafts. In this case it is fixed to link shaft 21, which is the end link shaft in line.

A terminal joint swivel seat 41 is spaced from and faces the terminal joint base. There is a terminal shaft 42 with a swivel head 43 thereon to mount the terminal shaft for swivel movement. The terminal shaft has an outer diameter smaller than the least transverse dimension of the terminal joint swivel seat. Its swivel head has a diameter larger than that least transverse dimension whereby the terminal shaft swivel head is trapped by the terminal joint swivel seat. The axial passage 23 continues through the terminal joint base. The swivel seat of the terminal joint is conveniently formed on two fingers 44, 45 as segments leaving side gaps 46, 47 which can give a greater range of angular adjustment to the terminal shaft. Again, swivelling is possible in all lateral directions. A clamp 50 is mounted to the end of the terminal shaft. It has a pair of arms 51, 52 with a screw 53 threaded through arm 52 to bear against an object to be positioned such as a retractor, as shown in FIG. 4.

It will be noted that the construction described this far is entirely limp with free movement around all of the joints. In order to rigidify it to hold the adjustment, a drive system is provided. For this purpose a first drive pin 55 is slidingly fitted in passage 23, and a second drive pin 56 is slidably fitted in passage 23. Conveniently these pins may have rounded ends 57, 58 where they bear against the force transmission means or against the swivel head. The other ends may conveniently be flat. The length of these pins is such that when the device is fully tightened, the ends of the pins will contact the balls and the swivel head without impediment.

Drive means 60 interlinks the first link shaft and the first drive pin to press the first drive pin against the force transmission means. A convenient construction is a thumb screw 61 with external threads 62 adapted to be threaded into internal threads 63 in the first link shaft. Tightening the thumb screw will move the first drive pin toward the link joint, which in turn will drive the ball toward the second link shaft, which in turn will drive the swivel head 43 against the swivel seat 41.

FIG. 5 illustrates that an additional link joint 65 or more link joints than that, may be added into the system without limitation on number. Generally however a single link joint and single terminal joint will be adequate.

In use, an instrument or retractor is placed in the clamp and the first link shaft is clamped to a support such as an operating chair or the like. Then the thumb screw 61 is loosened and the retractor is moved by surgeon to accomplish its function. When the desired position is reached, the thumb screw is tightened down to rigidify the system. This rigidifying is accomplished by driving the first drive pin against ball 33, which in turn drives second drive pin 56 against swivel head 43 which drives it against the swivel seat 41. In turn this draws the second link shaft to the right in FIG. 1 against swivel seat 32 which in turn draws the first swivel seat 31 against the first swivel head 24 thereby drawing all of these connections into tight contiguity.

As a means to understand this invention, it is evident from an examination of FIG. 1 where everything is stretched in a straight line, that the rigidifying action is one of extending the drive system to the right to "stretch" the exterior members comprising the link shaft so as to cause the swivel heads and swivel seats to bear tightly against one another. The same situation occurs if the joints are bent because, as can best be seen in FIG. 2, if the drive pin is driven from an angle it still moves the ball against the second drive pin which in turn can be driven at any angle by the ball. The rounded driving ends of the pins are an assistance in this regard.

This invention thereby provides a convenient construction which gives to the surgeon a creep-free device to hold a retractor or other instrument in a position which he can readily determine and hold by the mere tightening of a screw or other drive means.

This invention is not to be limited by the embodiments shown in the drawings and described in the description which are given by way of example and not of limitation, but only in accordance with the scope of the appended claims.

I claim:

1. A jointed holder for holding an article in an adjusted position, comprising:

a link joint comprising a first and a second rigid link shaft, each said link shaft having an axial passage therethrough and a swivel head adjacent to an end thereof, said head extending around and projecting beyond the outer wall of its respective shaft, a link joint housing having an axis, an internal axial chamber, a first and a second port entering said chamber coaxially on its axis, a first and a second swivel seat in said chamber coaxial with said ports and with said axis, and facing toward each other, each said link shaft passing through a respective port, with its swivel head in contact with a respective swivel seat, each said link shaft having an outer diameter smaller than the least transverse dimension of its respective port to enable the link shaft to be moved angularly relative to the swivel seat, and a force transmission member axially movably disposed inside said chamber;

a terminal joint comprising a terminal joint base fixed to one of said link shafts, a terminal joint swivel seat supported by, spaced from, and facing said terminal joint base, a terminal shaft, a swivel head on said terminal shaft engaged to said terminal joint swivel seat for swivel movement, the terminal shaft having an outer diameter smaller than the least transverse dimension of said terminal joint swivel seat, and its swivel head having a diameter larger than said least transverse dimension whereby said shaft swivel head is trapped by said terminal joint swivel seat, the axial passage in said last named link shaft continuing through said terminal joint base;

a first drive pin slidingly fitting in the axial passage in said first link shaft, and a second drive pin slidingly fitted in the axial passage in said second link passage, said drive pins being so proportioned as to bear against said force transmission members, and said second drive pin being so proportioned and arranged as also to bear against said terminal joint swivel head;

clamp means on said terminal shaft to engage an article to be positioned; and drive means interlinking said first link shaft and said first drive pin to press said first drive pin against said force transmission means, said force transmission means against said second drive pin, and said second drive pin against said terminal joint swivel head to cause said terminal joint swivel head to engage and lock with said terminal joint swivel seat, thereby to draw said second link joint swivel head against said second swivel seat, and drawing said first link joint swivel seat against said first link joint swivel head, all to extend said holder whereby lock all interfaces of swivel seats and swivel heads against swivel motion.

2. A jointed holder according to claim 1 in which said drive means comprises a screw thread coupling which drives said first drive pin relative to said first link shaft.

3. A jointed holder according to claim 2 in which said first drive pin is threaded to said first link shaft.

4. A jointed holder according to claim 2 in which said screw thread coupling comprises a screw threaded to said first link shaft and bearing against said first drive pin.

5. A jointed holder according to claim 1 in which said force transmission means is a ball.

6. A jointed holder according to claim 1 in which said terminal joint swivel head includes a spherical force transmission surface facing toward and in contact with said second drive pin.

7. A jointed holder according to claim 1 in which said terminal joint swivel seat is formed on a plurality of fingers, said fingers leaving gaps of significant size to enable the terminal shaft to swivel between them.

8. A jointed holder according to claim 7 in which said terminal joint swivel seat on all of the fingers have the same center of curvature.

9. A jointed holder according to claim 2 in which said terminal joint swivel seat is formed on a plurality of fingers, said fingers leaving gaps of significant size to enable the terminal shaft to swivel between them.

10. A jointed holder according to claim 4 in which said terminal joint swivel seat is formed on a plurality of fingers, said fingers leaving gaps of significant size to enable the terminal shaft to swivel between them.

11. A jointed holder according to claim 5 in which said terminal joint swivel seat is formed on a plurality of fingers, said fingers leaving gaps of significant size to enable the terminal shaft to swivel between them.

12. A jointed holder according to claim 1 in which an additional said link joint is interposed between said drive means and said first link joint, together with an additional drive pin to drive said additional link joint.

13. A jointed holder according to claim 12 in which said said screw thread coupling comprises a screw threaded to said first link shaft and bearing against said first drive pin.

14. A jointed holder according to claim 5 in which said said screw thread coupling comprises a screw threaded to said first link shaft and bearing against said first drive pin.

* * * * *